(12) United States Patent
Nagata

(10) Patent No.: US 7,995,427 B2
(45) Date of Patent: Aug. 9, 2011

(54) MEDIUM MANAGEMENT METHOD AND STORAGE DEVICE

(75) Inventor: Atsushi Nagata, Kanagawa (JP)

(73) Assignee: Sony Corporation (JP)

( * ) Notice: Subject to any disclaimer, the term of this patent is extended or adjusted under 35 U.S.C. 154(b) by 299 days.

(21) Appl. No.: 12/384,525

(22) Filed: Apr. 6, 2009

(65) Prior Publication Data

US 2009/0257326 A1  Oct. 15, 2009

(30) Foreign Application Priority Data

Apr. 9, 2008  (JP) ................. P2008-100964

(51) Int. Cl.
*G11B 21/08* (2006.01)
(52) U.S. Cl. .................................. 369/30.34
(58) Field of Classification Search ............... 369/30.34, 369/30.32, 30.33, 30.31, 30.28, 30.35, 30.37; 381/71.4, 71.8, 71.1, 71.11; 340/538.12
See application file for complete search history.

(56) References Cited

U.S. PATENT DOCUMENTS 7,536,018 B2 * 5/2009 Onishi et al. ................ 381/71.8

FOREIGN PATENT DOCUMENTS

JP  10-333687 A  12/1998

* cited by examiner

*Primary Examiner* — Ali Neyzari
(74) *Attorney, Agent, or Firm* — Lerner, Davis, Littenberg, Krumholz & Mentlik, LLP

(57) ABSTRACT

A medium management method is disclosed. A removable medium is conveyed to a drive section when the removable medium is inserted into a medium accommodation section. The drive section reproduces and reads information from the medium and determines whether the medium is a first medium or a second medium on which data externally or internally created have been recorded according to the information read by the drive section. A partial reproduction operation is performed according to an edit list recorded on the first medium and the reproduced data are transferred to a pre-designated host system when the inserted medium is the first medium. The second medium is registered to a database when the determined result denotes that the inserted medium is the second medium. The medium is returned to the medium accommodation section after one of the partial reproduction operation and the database registration process has been completed.

5 Claims, 10 Drawing Sheets

Fig. 10

[Ingestion Service]
Auto Ingestion service configuration
AutoIngestion_mode            = 3
0 : DiscsID. STS only

1 : High Res. AutoIngestion

2 : Proxy AutoIngestion

3 : Partial AutoIngestion
Ingest_Server_ip              = 43.0.179.200
Ingestion Server IP address
Ingest_Dist_Pass              = /disk1/Proxy
Pass of the distination

MEDIUM MANAGEMENT METHOD AND STORAGE DEVICE

CROSS REFERENCES TO RELATED APPLICATIONS

The present application claims priority from Japanese Patent Application No. JP 2008-100964, filed in the Japanese Patent Office on Apr. 9, 2008, the entire content of which is incorporated herein by reference.

BACKGROUND OF THE INVENTION

1. Field of the Invention

The present invention relates to a medium management method and a storage device that structure an archive system that accommodates removable media such as optical discs and that are used for a broadcasting station.

2. Description of the Related Art

So far, to store a large amount of broadcasting video and audio information (hereinafter referred to as materials), a cart machine using video cassette tapes have been used. However, it has been desired to store digital materials and provide media that can be random-accessed to create programs. As a result, instead of tape cassettes, media such as optical discs, hard disks, semiconductor memories, and so forth have been used.

As shown in FIG. 1, a storage system of the related art is structured such that a disc recorder 201 and an editing device 202 are connected through a digital interface, for example, the Institute of Electrical and Electronics Engineers (IEEE) 1394 interface. The disc recorder 201 accommodates a disc 203, records data thereon, and reproduces data therefrom.

The disc 203 is structured such that a phase-change-recording type optical disc is housed in a cartridge and accessed through a shutter. Data are read and written from and to the disc 203 using a 405-nm wavelength laser. When the disc 203 is a single-layer type, it has a storage capacity of 23.3 GB. When the disc 203 is a double-layer type, it has a storage capacity of 50 GB. Camcorders that use such a disc as a record medium have been practically used (a camcorder is a video camera having a built-in recorder and is a trade name of Sony Corporation).

Compressed high resolution video/audio data are recorded on the disc 203. In addition, additional information of recorded images such as date, time, various kinds of comments, and so forth and proxy AV data (low-bit-rate video data) that can be used for offline editing are recorded as meta data on the disc 203.

Since meta data have been recorded on the disc 203, it can be accessed at high speed. In addition, the editing device 202 can directly access data of the disc 203 through a digital video interface. Data recorded on the disc 203 have a file structure shown in FIG. 2. For example, "C001.XML" represents one file, for example, an extensible markup language (XML) format file. A file is high resolution video audio/data corresponding to a scene, a cut, or the like and is referred to as a clip. Content (program) is a set of clips.

FIG. 3 is a flow chart showing a flow of a process of a storage system of the related art. The disc recorder 201 detects that the disc 203 has been inserted (at step S1). The disc recorder 201 informs the editing device 202, which is a host device, that the disc 203 has been inserted (at step S2).

At step S3, it is determined whether or not a request has been issued from the editing device 202. When the determined result denotes that a request has been issued, the flow advances to step S4. At step S4, data are reproduced (read) from the disc 203 and the reproduced data are transferred to the editing device 202. A file structure as shown in FIG. 2 is displayed on a display section of the editing device 202. When the operator of the editing device 202 designates his or her desired clip, clip information corresponding to the designated clip is transferred to the disc recorder 201 and the disc recorder 201 reproduces the designated clip.

At step S5, it is determined whether or not a transfer request has been issued. When the operator designates a clip, the transfer request is issued. At step S6, the designated clip is transferred and the process is completed.

Japanese Patent Application Laid-Open Publication No. HEI 10-333687, referred to as Patent Document 1, describes a technique of which when a video material recorded on a disc is registered to an archive management device, the video material is categorized as a group using meta data that have been recorded along with the video material and the editing device accesses the video material corresponding to the categorized group.

SUMMARY OF THE INVENTION

However, the storage device of the related art only performs a passive process for a host system (server). At step S2 of the flow chart shown in FIG. 3, when the disc is inserted into the disc recorder 201, it only informs the host system of an ID or the like of the inserted disc. Even in the technique described in Patent Document 1, since it only categorizes a video material as a group, although data can be effectively accessed, the host system accesses information stored in the archive system. Thus, the archive system passively performs a process for the host system.

Thus, there was a problem that since the host system controlled access to the storage device, processes were not performed at sufficient speed with sufficient efficiency.

In view of the foregoing, it would be desirable to provide a medium management method and a storage device that can solve the foregoing problems of the related art.

According to an embodiment of the present invention, there is provided a medium management method. A removable medium is conveyed to a drive section when the removable medium is inserted into a medium accommodation section. The drive section reproduces and reads information from the medium and determines whether the medium is a first medium on which data externally created have been recorded or a second medium on which data internally created have been recorded according to the information that has been read by the drive section. A partial reproduction operation is performed according to an edit list recorded on the first medium and the reproduced data are transferred to a pre-designated host system when the determined result denotes that the inserted medium is the first medium. The second medium is registered to a database when the determined result denotes that the inserted medium is the second medium. The medium is returned to the medium accommodation section after one of the partial reproduction operation and the database registration process has been completed.

The medium is determined as the first medium or the second medium depending on whether or not the medium contains a management file that is internally recorded.

It is determined whether or not the first medium contains the edit list when the determined result of the first determining step denotes that the inserted medium is the first medium. The pre-designated host system is informed that the first medium has been accommodated in the medium accommodation section when the determined result of the second determining step denotes that the disc does not contain the edit list.

High resolution video data and low resolution video data are recorded to the medium. It is determined whether or not the medium contains the edit list when the determined result of the first determining step denotes that the inserted medium is the first medium. The control section transfers one of the high resolution video data and the low resolution video data recorded on the first medium to the pre-designated host system when the determined result of the third determining step denotes that the medium does not contain the edit list.

According to an embodiment of the present invention, there is provided a storage device. The storage device includes a medium accommodation section, a drive section, a conveying section, and a control section. The medium accommodation section accommodates a removable medium and is capable of replacing the medium with another one. The drive section records/reproduces data to and from the medium. The conveying section conveys the medium between the medium accommodation section and the drive section. The control section controls the drive section and the conveying section, creation of a database to manage the medium accommodated in the medium accommodation section, and communication with a host system. The control section controls the conveying section to convey the medium inserted in the medium accommodation section to the drive section and determines whether or not the medium is a first medium on which data externally created have been recorded or a second medium on which data internally created have been recorded according to the information that has been read by the drive section. The control section performs partial reproduction operation according to an edit list recorded on the first medium and transfers the reproduced data to a pre-designated host system when the determined result denotes that the inserted medium is the first medium. The control section registers the second medium to the database when the determined result denotes that the inserted medium is the second medium. The control section controls the conveying section to return the medium to the medium accommodation section when one of the partial reproduction operation and the database registration process has been completed.

According to an embodiment of the present invention, when a medium on which data have been recorded by an external recorder of a storage device, for example, a recorder-built-in video camera is inserted, a partial reproduction operation is automatically performed and reproduced data are transferred to a pre-designated host system.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 10 is a schematic diagram showing an example of a setting file of an embodiment of the present invention.

DETAILED DESCRIPTION OF THE PREFERRED EMBODIMENTS

Figure 1:
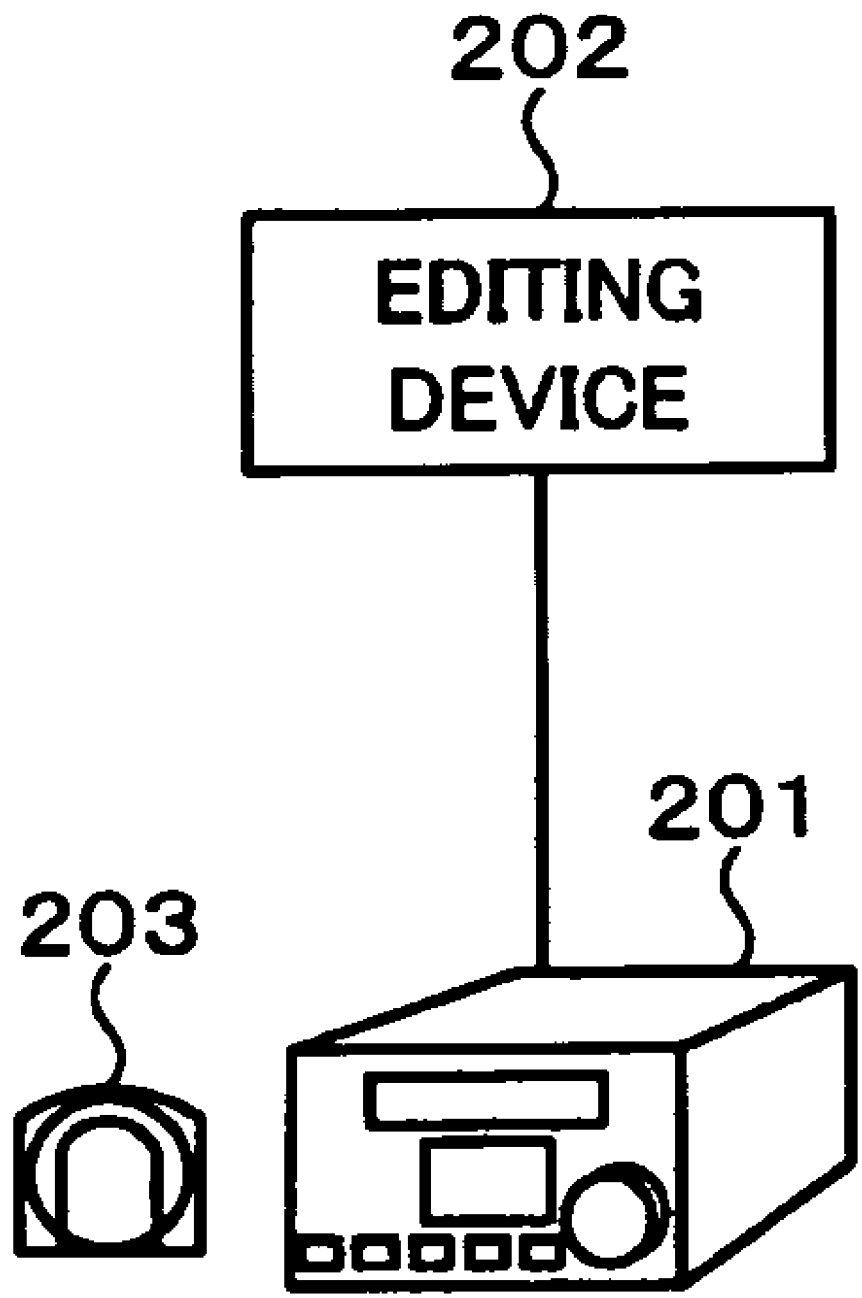
FIG. 1 is a block diagram showing an example of a storage device of the related art.
Figure 2:
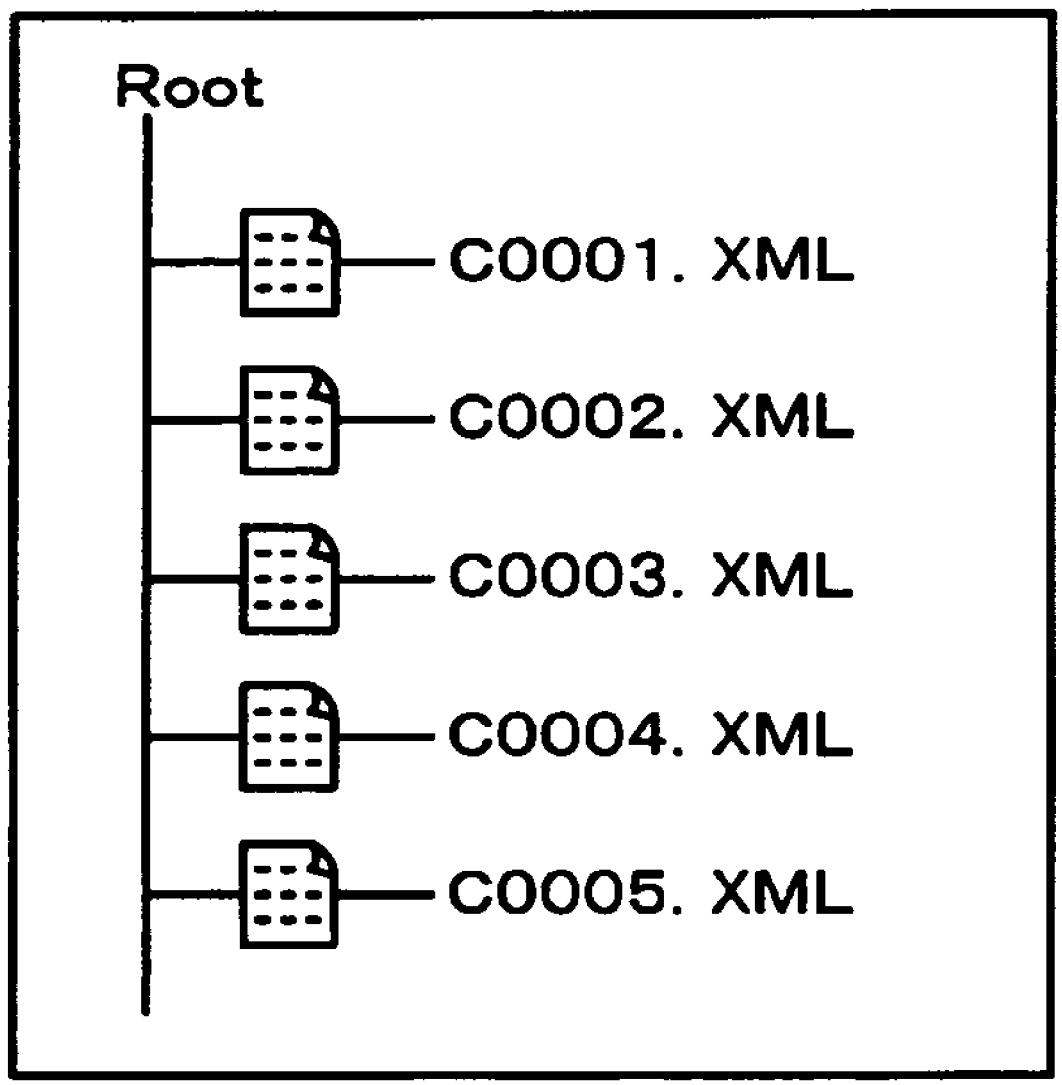
FIG. 2 is a schematic diagram describing the storage device of the related art.
Figure 3:
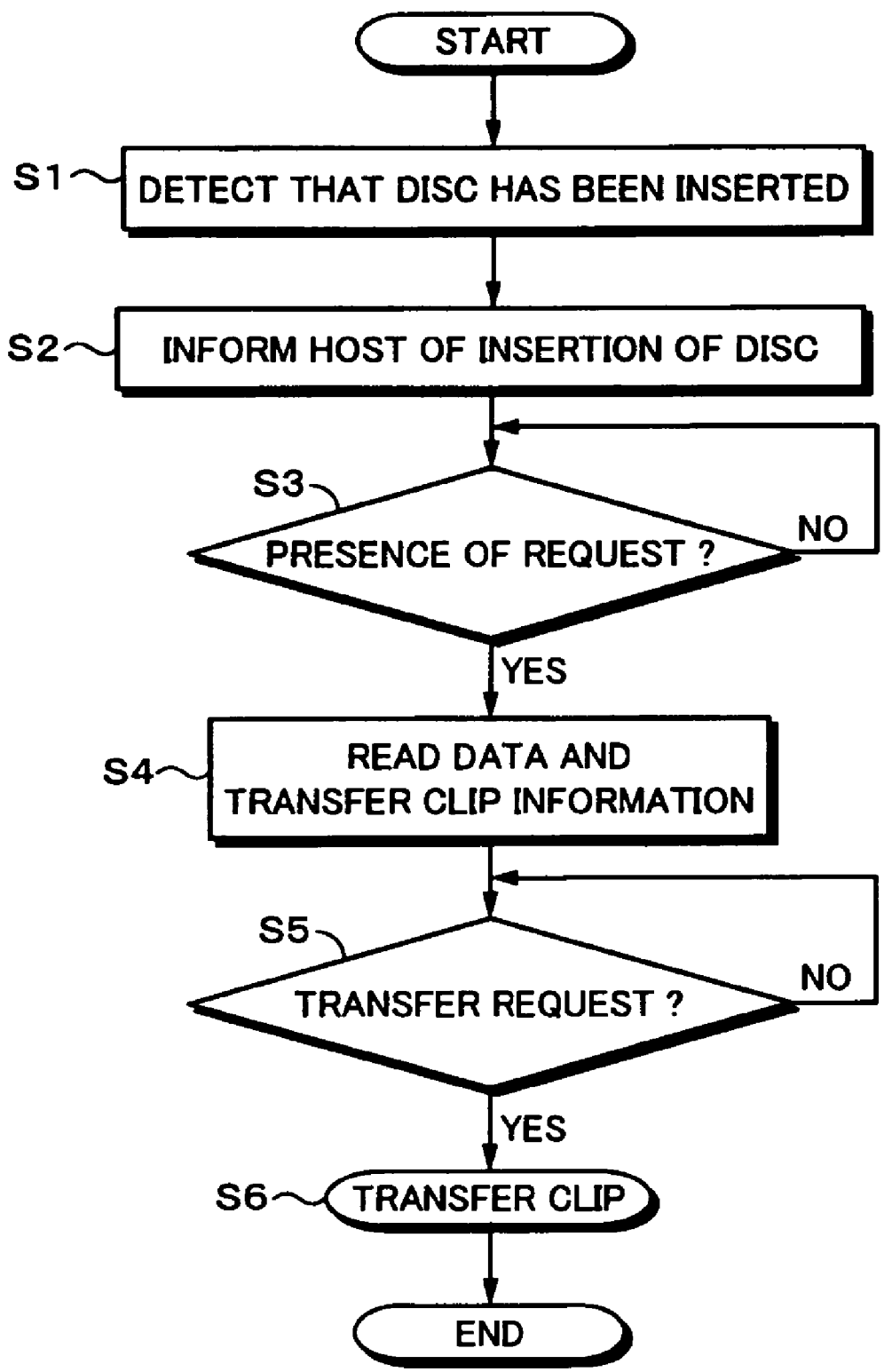
FIG. 3 is a flow chart showing a flow of a process of the storage device of the related art.

Next, with reference to the accompanying drawings, embodiments of the present invention will be described. Although these embodiments that will be described in the following are preferred ones of the present invention and various technically preferably limitations are imposed thereto, it is appreciated that the scope of the present invention is not limited to these embodiments unless described that they impose limitations to the present invention.

Next, an embodiment of the present invention will be described. A medium management method of this embodiment is described in a flow chart shown in FIG. 4. In other words, the medium management method includes step S11 at which a removable medium is conveyed to a drive section when the removable medium is inserted into a medium accommodation section, steps S15 and S18 at which the drive section reproduces and reads information from the medium and determines whether the medium is a first medium (auto ingestion disc) on which data externally created have been recorded or a second medium (archive disc) on which data internally created have been recorded according to the information that has been read by the drive section, step S24 at which a partial reproduction operation is performed according to an edit list (SMI file) recorded on an auto ingestion disc and the reproduced data are transferred to a pre-designated host system when the determined result denotes that the inserted medium is the auto ingestion disc, step S16 at which an archive disc is registered to a database when the determined result denotes that the inserted medium is the archive disc, and step S17 at which the medium is returned to the medium accommodation section after one of the partial reproduction operation and the database registration process has been completed.

Next, an embodiment of the present invention will be described. A storage device of this embodiment is described with reference to FIG. 5, FIG. 6, and FIG. 7 and a flow chart shown in FIG. 4. The storage device includes a medium accommodation section 103, a drive section 106, a conveying section 105, and a control section 111, 112. The medium accommodation section 103 accommodates a removable medium, for example a disc, and is capable of replacing the disc with another one. The drive section 106 records/reproduces data to and from the disc. The conveying section 105 conveys the disc between the medium accommodation section 103 and the drive section 106. The control section 111, 112 controls the drive section 106 and the conveying section 105, creation of a database to manage the disc accommodated in the medium accommodation section 103, and communication with a host system 121, 122. The control section 111, 112 controls the conveying section 105 to convey the disc inserted in the medium accommodation section 103 to the drive section 106 and determines whether or not the disc is a first disc (auto ingestion disc) on which data externally created have been recorded or a second disc (archive disc) on which data internally created have been recorded according to the information that has been read by the drive section 106 (at steps S15, S18). The control section 111, 112 performs a partial reproduction operation according to an edit list (SMI file) recorded on the auto ingestion disc and transfers the reproduced data to a pre-designated host system 121, 122 when the determined result denotes that the inserted disc is the auto ingestion disc (at step S24). The control section 111, 112 registers the archive disc to the database when the determined result denotes that the inserted disc is the archive disc (at step S16). The control section 111, 112 controls the conveying section 105 to return the disc to the medium accommodation section 103 when one of the partial reproduction operation and the database registration process has been completed (at step S17).

Next, several technical terms used in the following description will be defined.

NLE (Non Linear Editing): digital video editing performed on a hard disk of a personal computer or a workstation without using a video tape.

Clip: a file of high resolution video/audio data corresponding to a scene, a cut, or the like. Content (program) is a set of clips.

FTP server: a server that transmits and receives files according to the FTP (File Transfer Protocol).

FTP (File Transfer Protocol): a communication protocol based on which a file is transferred on the network.

MXF (Material exchange Format): a standard file format that uses as a connection format the Ethernet (registered trademark) that is being standardized by the Pro-MPEG forum. Since MXF is a file transfer format that does not depend on a compression system and a signal format for use, a streaming function can be accomplished by transferring a file in an environment such as the Internet or LAN. In addition, along with AV content, meta data of its title, type, capturing place, and camera equipment can be transmitted.

Archive disc: a disc whose data are recorded, stored, and managed by a storage device.

Auto ingestion disc: a disc on which information has been recorded outside a storage device and the information recorded on the disc is automatically retrieved to the system.

Disc management file: management data used in a storage device. The disc management file describes, for example, record date/time, data capacity, last access date/time, format of AV data, and so forth. The disc management data are recorded in a storage device. An archive disc can be distinguished from an auto ingestion disc depending on whether or not the disc contains disc management data.

SMI file: a text file written in SMIL (Synchronized Multimedia Integration Language). SMIL is a multimedia descriptive language created in XML to control information with respect to time. To execute SMIL, it is necessary to have installed software (Real Player (trade name) or the like) that can reproduce a file written in SMIL.

Discs. STS: a file that informs a host system that an auto ingestion disc has been inserted into a storage device.

Setting file: a setting file of a storage device.

High res file: a high resolution file. An original high resolution audio/visual file.

Proxy file: a low resolution file. A low resolution file of which a high res file has been compressed. Since the data amount of a proxy file is small, its transfer time is short. A proxy file can be used to create edit information and search for moving images.

Partial retrieve: a transfer of a partial file. By designating a desired portion of a high res file, the designated portion can be read from the disc. This is a transfer function of FTP.

Transferred according to FTP: content is transferred to a disc area of a server on a designated network according to a setting file.

Figure 5:
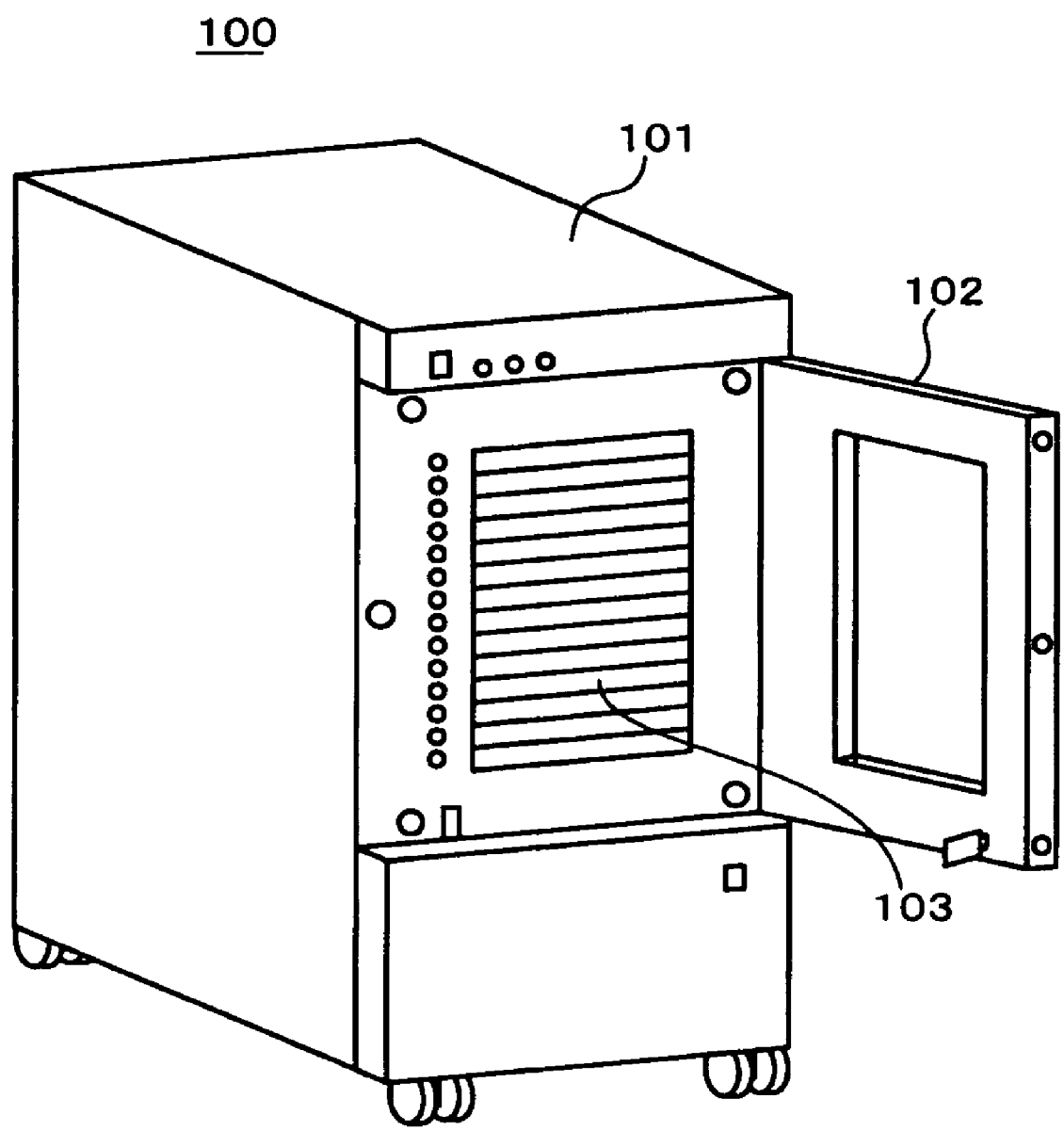
FIG. 5 is a perspective view showing an appearance of an embodiment of the present invention.

As shown in FIG. 5, a storage device (also referred to as a disc cart system or a disc changer) 100 according to an embodiment of the present invention has an open/close door 102 disposed on one surface of a box-shaped case 101. Disposed in the case 101 are a disc accommodation shelf 103 having accommodation sections each of which can accommodate, for example, 20 discs, a drive block that records/reproduces data to/from a disc, a conveying block that conveys a disc, an electric block that houses a power supply and a control section (computer and so forth), and so forth.

The storage device 100 handles removable media such as discs, card-shaped semiconductor memories, and so forth. In this embodiment, discs are used. The discs are structured such that a phase-change-recording type optical disc is housed in a cartridge and accessed through a shutter. Data are read and written from and to the disc 203 using a 405-nm wavelength laser. When the disc is a single-layer type, it has a storage capacity of 23.3 GB. When the disc is a double-layer type, it has a storage capacity of 50 GB.

A camcorder (a video camera with a built-in recorder, a trademark of Sony Corporation) that uses such a disc as a record medium has been practically used. In addition, a portable recorder that is connected to the camcorder through the IEEE 1394 interface has been practically used. This recorder has a function that performs simple cut editing for a material recorded on a disc and stores an edited result (a simple editing list that defines a start position and a length of the material) as an SMI file on the disc. In addition, a bar code label is adhered on the front surface of the disc cartridge such that the disc is managed with a disc ID represented by the bar code.

Compressed high resolution video/audio data (high res file) are recorded on the disc. In addition, additional information of recorded images, such as date, time, various kinds of comments, and so forth, and a proxy file (low resolution file) are recorded as meta data on the disc 203.

Next, with reference to FIG. 6A and FIG. 6B, outlined operations of the storage device 100 will be described. As represented by arrow A in FIG. 6A, the disc accommodation shelf 103 can be horizontally moved such that the disc accommodation shelf 103 is positioned adjacent to the door 102 side (front side) as shown in FIG. 6A and can be retreated such that the disc accommodation shelf 103 is positioned adjacent to the electric block 104 (back side) as shown in FIG. 6B.

Figure 6A:
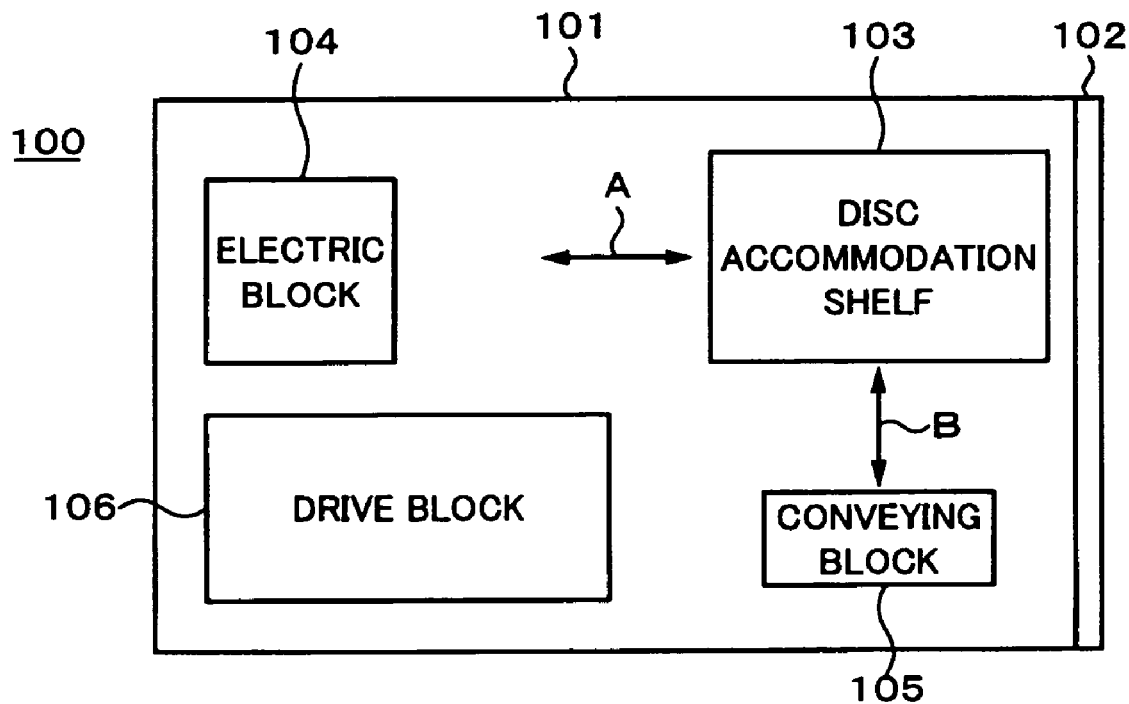
FIG. 6A and FIG. 6B are schematic diagrams showing operations of a mechanical section of an embodiment of the present invention.
Figure 6B:
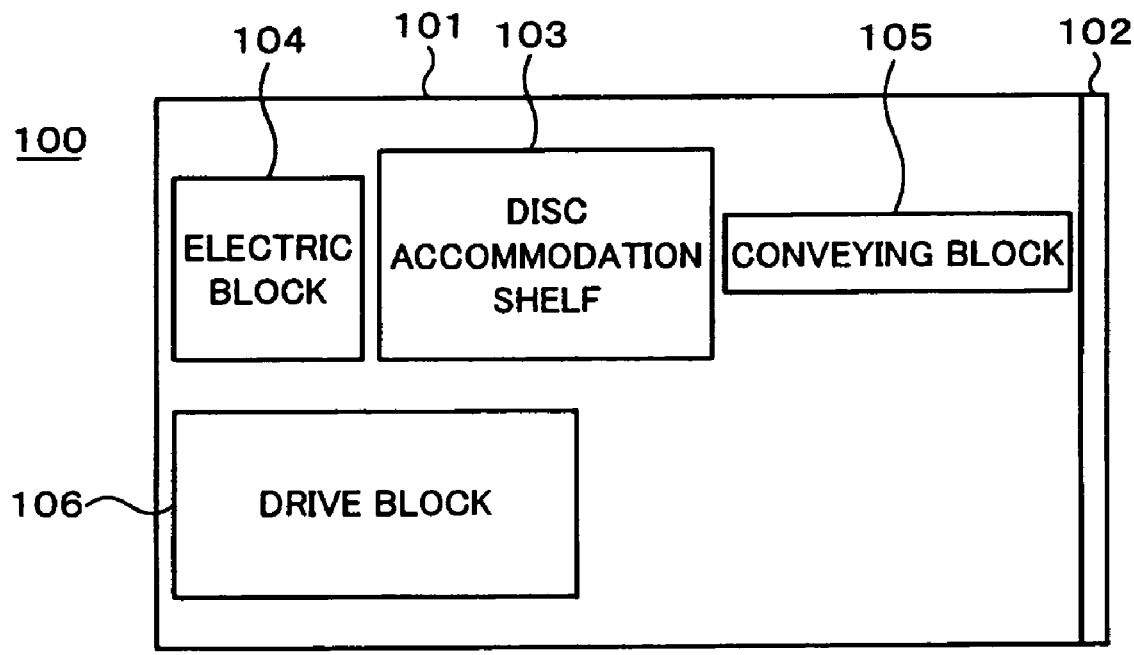

The conveying block 105 can be raised or lowered as represented by arrow B such that the conveying block 105 is positioned adjacent to the drive block 106 as shown in FIG. 6A or adjacent to the front side of the disc accommodation shelf 103 that is retreated as shown in FIG. 6B, respectively.

In the normal state, when the conveying block 105 is stopped, neither raised nor lowered, including the state that the drive block 106 is performing recording/reproducing operation, the disc accommodation shelf 103 is positioned on the rear side (front operator side) of the door 102 as shown in FIG. 6B. By opening and closing the door 102, discs accommodated in the disc accommodation shelf 103 can be replaced. The conveying block 105 is in a stand-by state in front of the drive block 106.

When a disc is conveyed from a predetermined bin (identified by a pin number) of the disc accommodation shelf 103 to the drive block 106 as commanded by application software, the disc accommodation shelf 103 is moved from a position on the operator side to a rear position shown in FIG. 6B. The conveying block 105 is moved from the position in front of the drive block 106 to a position in front of the disc accommodation shelf 103. A disc designated by the host system is taken out from the disc accommodation shelf 103. Thereafter, the conveying block 105 is lowered and moved to the position in front of the drive block 106. The disc held on the conveying block 105 is inserted into the drive block 106.

When a disc to or from which data have been completely recorded or reproduced by the drive block 106 is conveyed to a predetermined bin of the disc accommodation shelf 103, it is moved to the rear position. The disc unloaded from the drive block 106 is received by the conveying block 105. The conveying block 105 is raised and moved to the position in front of the disc accommodation shelf 103 (see FIG. 6B). Thereafter, the disc held on the conveying block 105 is inserted into the predetermined bin of the disc accommodation shelf 103. Thereafter, the conveying block 105 is lowered and moved to the position in front of the drive block 106. Thereafter, the disc is moved to the operator side.

Figure 7:
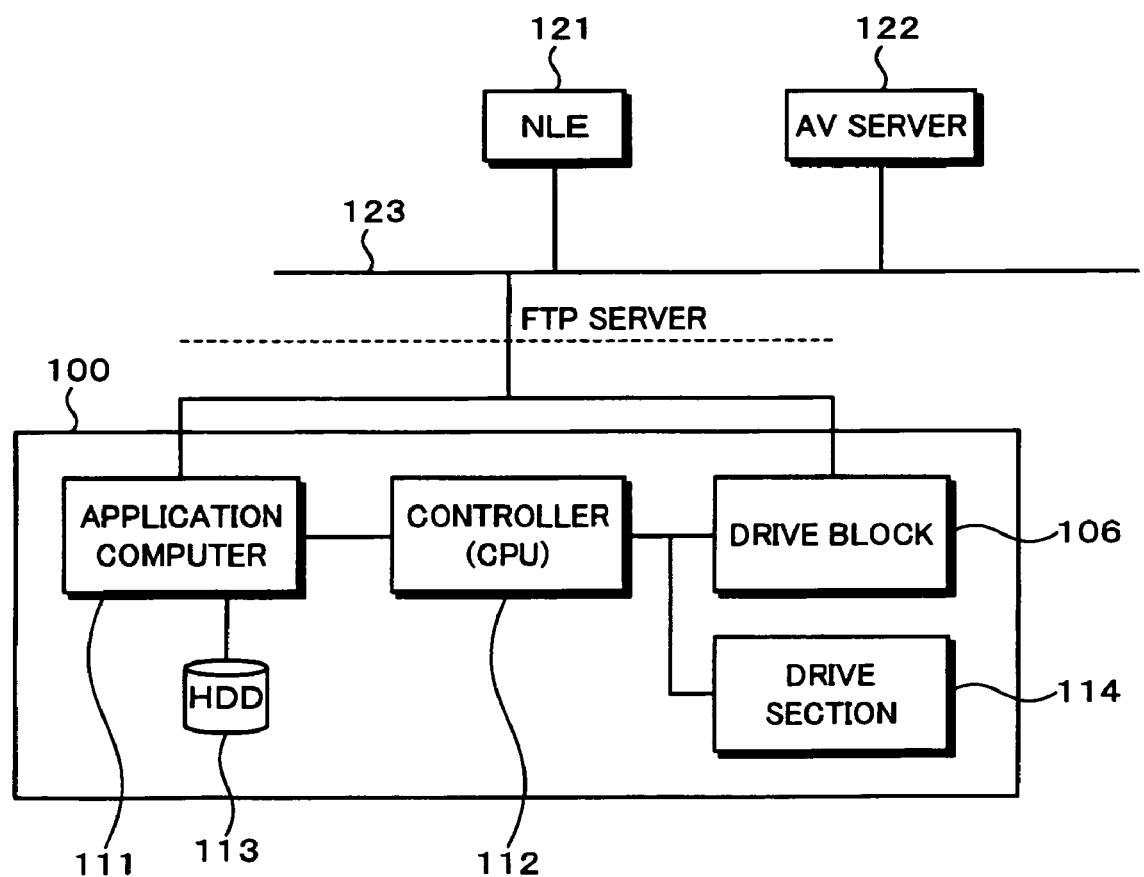
FIG. 7 is a block diagram showing an electric block of an embodiment of the present invention.
Figure 8:
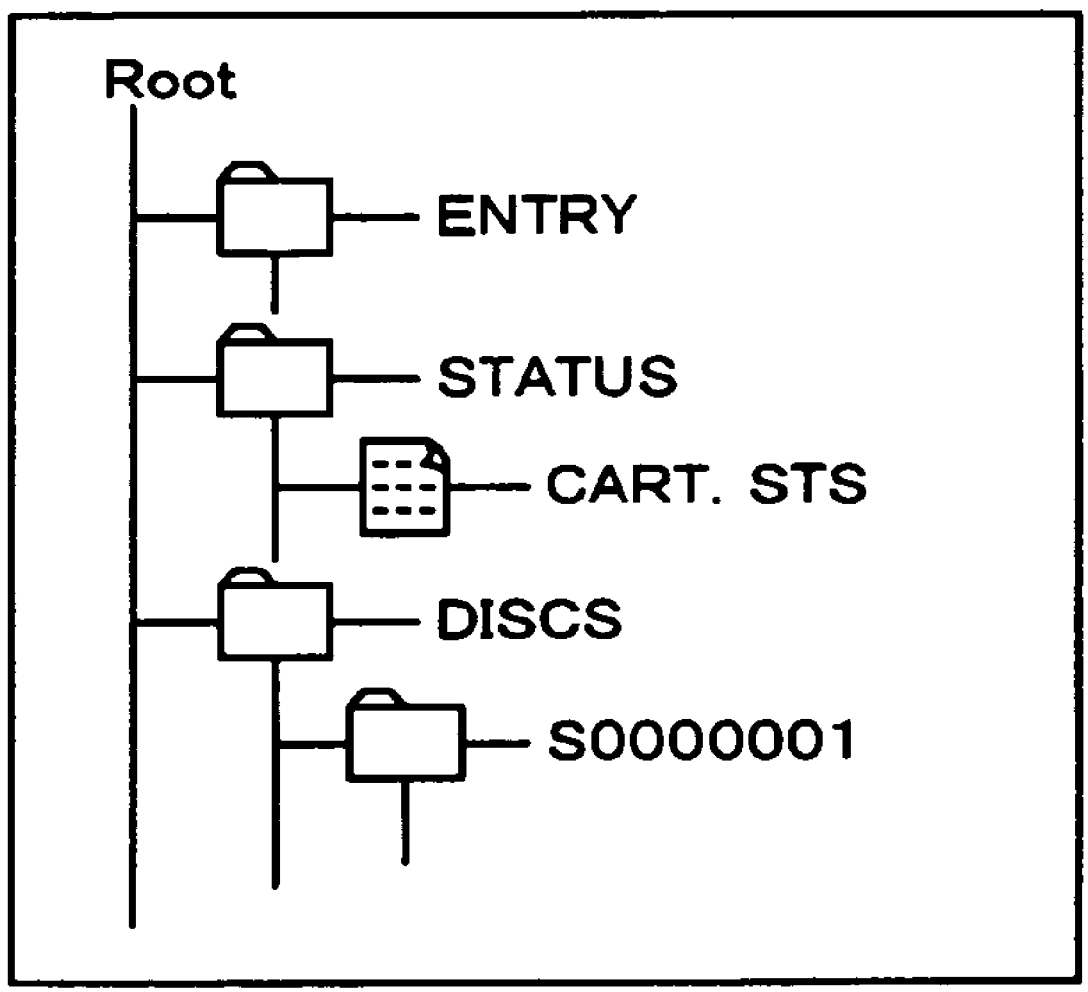
FIG. 8 is a schematic diagram describing a file system of an embodiment of the present invention.

As shown in FIG. 7, the electric block 104 contains an application computer 111, a controller (computer) 112, and a hard disk 113. The hard disk 113 stores a database of attribute information, format information, and so forth of discs accommodated in the storage device 100.

The application computer 111 has been connected to an editing device (NLE) 121 and an audio visual (AV) server 122 as host devices through a local area network (LAN) 123, for example, gigabit Ethernet (registered trademark). Interface software has been installed in the application computer 111 such that file format (for example, MXF format) data can be exchanged with other devices on the network.

The editing device 121 edits materials of the storage device 100. The AV server 122 creates materials to be transmitted from those of the storage device 100. In addition, a content server, an archive (large capacity storage), or the like may be connected as a host system.

The host system can see the storage device 100 as an FTP server. As shown in FIG. 1, a host system can grasp the file system of the storage device 100.

The controller 112 controls the operations of the drive section 114 such as a motor, a solenoid, and so forth that drive mechanisms (disc accommodation shelf 103 and conveying block 105) of the foregoing storage device. In addition, the controller 112 controls recording/reproducing operations of the drive block 106. Connected to the controller 112 are the drive block 106 and the drive section 114. Data recorded and reproduced to and from the drive block 106 are transmitted through the LAN 123.

Figure 9:
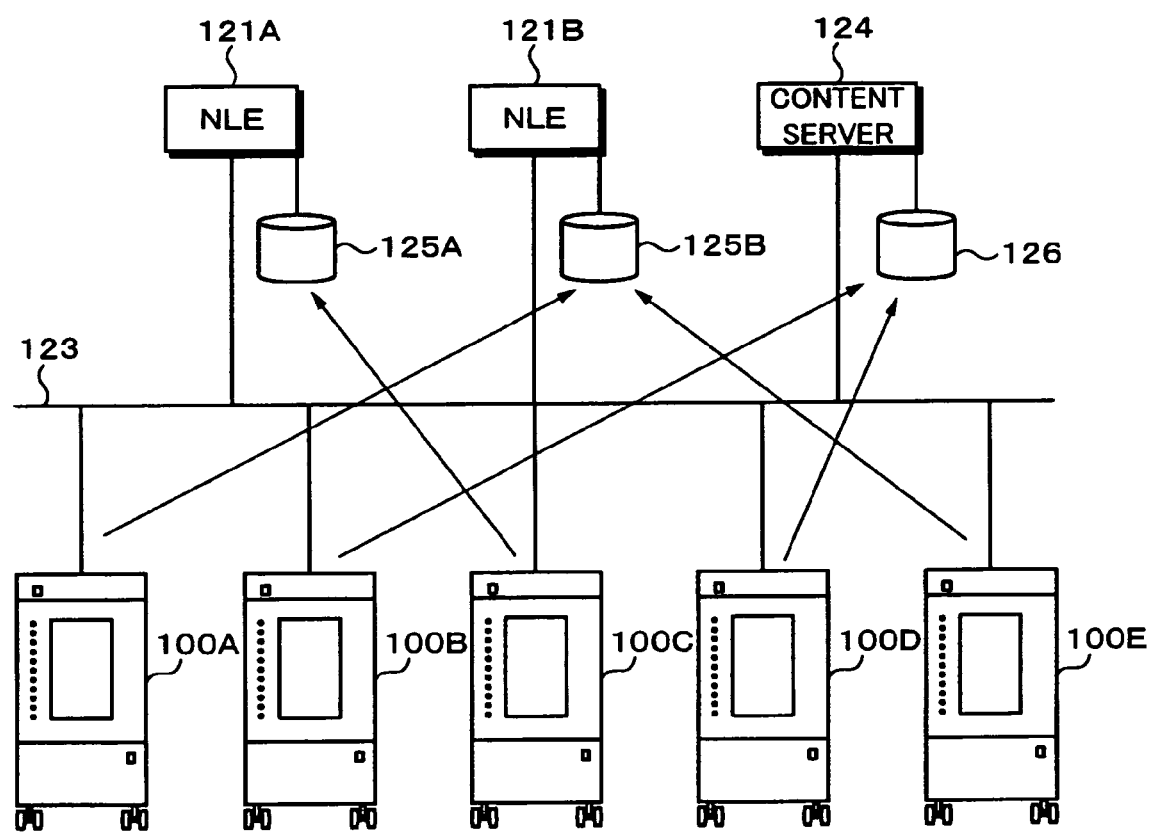
FIG. 9 is a schematic diagram showing an example of an operation of a storage device of an embodiment of the present invention.

In a real broadcasting station, as shown in FIG. 9, a more complicated structure is used, for example, a plurality of storage servers 100A, 100B, 100C, 100D, and 100E, two editing devices 121A and 121B, a content server 124 are connected through a LAN 123. When the user pre-sets the storage devices, connections of the storage devices and the host system are defined as shown in FIG. 9.

In other words, data are transferred from the storage devices 100A and 100E to a hard disk 125B of the editing device 121B. Data stored in the storage devices 100B and 100D are transferred to a hard disk 126 of the content server 124. Data stored in the storage device 100C are transferred to a hard disk 125A of the editing device 121A.

Even if a plurality of storage devices and a plurality of host devices are connected in such a manner, as will be described later, when the plurality of storage devices are operated in parallel, data reproduced from each storage device can be automatically transferred to a desired server (hard disk).

Figure 4:
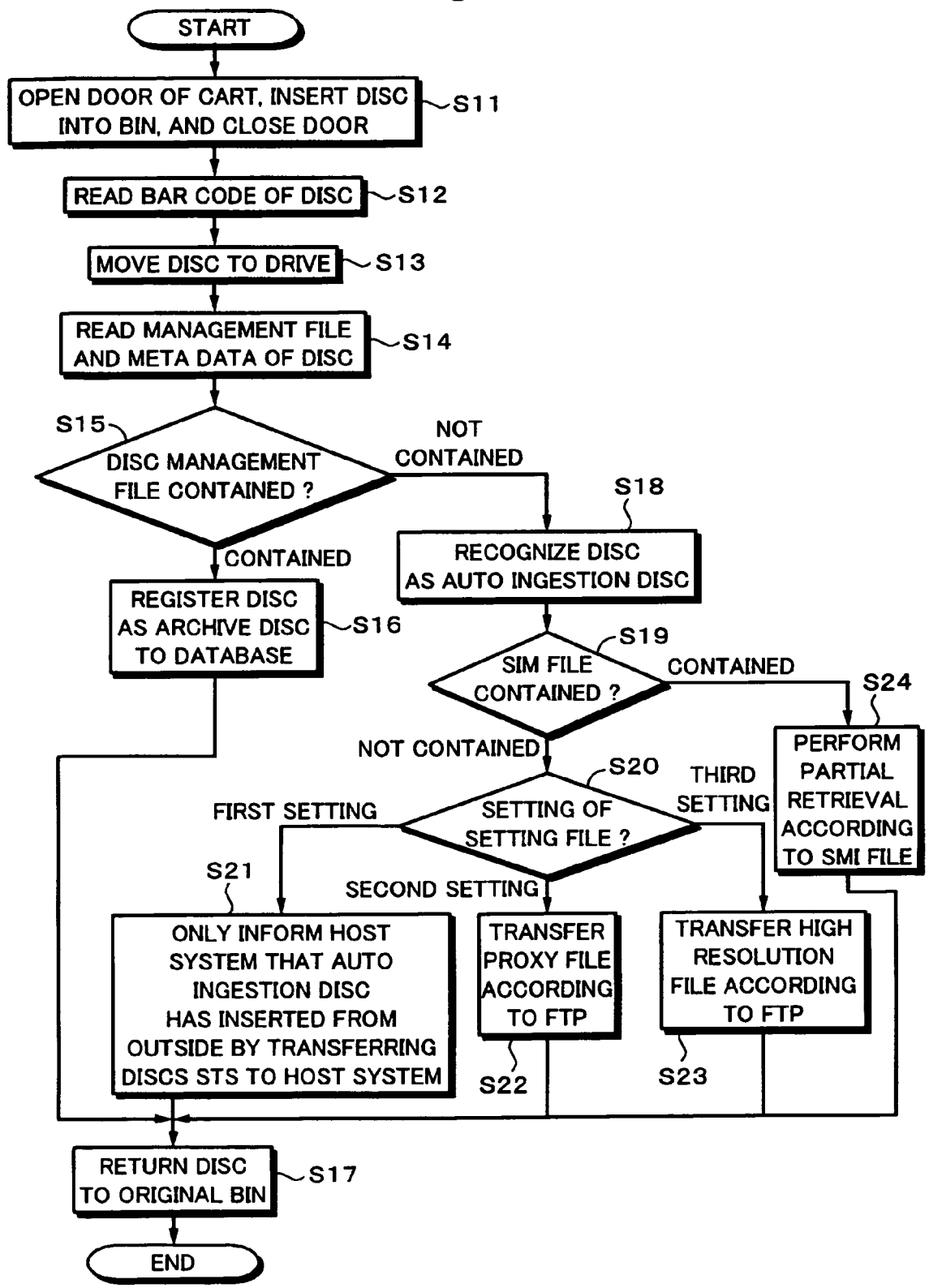
FIG. 4 is a flow chart showing a flow of a process of an embodiment of the present invention.

Next, with reference to FIG. 4, an operation of an embodiment of the present invention will be described. This operation is performed under the control of the application computer 111 and the controller 112.

At step S11, the door is opened, a disc is inserted into a bin of the disc accommodation shelf, and then the door is closed. At step S12, a bar code attached on the cartridge of the inserted disc is read. The bar code represents the disc ID of the disc. The disc ID is also recorded as data to the disc besides the bar code.

At step S13, the disc accommodation shelf and the conveying block perform the foregoing operations. The conveying block conveys the inserted disc to the drive block and inserts the disc thereinto. At step S14, the drive block reads a management file and meta data from the loaded disc.

At step S15, it is determined whether or not the disc contains a disc management file that is management data used in the storage device. When the determined result denotes that the disc contains a disc management file, it is determined that an attribute of the disc be an archive disc on which data are recorded in the storage device and that is managed therein. At step S16, the inserted disc is registered as an archive disc to the database. At step S17, the disc is returned to the original bin of the disc accommodation shelf.

As described above, the disc accommodation shelf is moved to the rear position and the disc unloaded from the drive block is received by the conveying block. The conveying block is raised and moved to the position in front of the disc accommodation shelf. The disc held on the conveying block is returned to the disc accommodation shelf. Thereafter, the conveying block is lowered and moved to the position in front of the drive block. Thereafter, the disc accommodation shelf is moved to the operator side.

When the determined result at step S15 denotes that the disc does not contain a disc management file, the flow advances to step S18. At step S18, it is recognized that the attribute of the disc is an auto ingestion disc. An auto ingestion disc is a disc on which information is recorded by a device other than the storage device, for example a camcorder, and the recorded information is automatically retrieved to the system.

At step S19, it is determined whether or not the disc contains an SMI file. An SMI file is information of an edited result (simple edit list that defines a start position and a length of a material) obtained using a portable recorder connected to the camcorder through the IEEE 1394 interface. When the determined result at step S19 denotes that the disc does not contain an SMI file, the flow advances to step S20. At step S20, the setting of a setting file is checked and a process is performed based on the setting. A setting file is a file that contains data of setting that the user has performed on a menu screen. For example, three types of settings can be performed.

When a first setting has been performed, the flow advances to step S21. At step S21, a discs. STS stored in the storage device is transferred to the host system such that the host system (server) is informed that an auto ingestion disc has been inserted from the outside. This is just an informing mode.

When a second setting has been performed, the flow advances to step S22. At step S22, a proxy file that is a low resolution file of which a high res file has been compressed is transferred to a designated host system (server) according to the FTP. For example, when the editing device of the host system receives a proxy file, the editing device edits the proxy file and creates edit information. The storage device is controlled to perform partial reproduction according to the created edit information and obtain an MXF file of a portion necessary for main editing.

When a third setting has been performed, the flow advances to step S23. At step S23, a high res file (MXF file) is transferred to a designated host system (server) according to the FTP. This setting is performed for a system that retrieves an MXF file, not performs editing using a proxy file.

When the determined result at step S19 denotes that the disc contains an SMI file, the flow advances to step S24. At step S24, partial reproduction is performed for a period designated from the start position according to the SMI file (simple edit list). The partially reproduced data are transferred to a designated host system (server).

This setting is effective when an SMI file is created in the field before a disc is inserted into a storage device. A partial reproduction operation (auto ingestion) is the best in efficiencies of hard disks of the storage device and the host system because transfer traffic is decreased, work time becomes short, and unnecessary files are not stored.

As described above, in an embodiment of the present invention, meta data of a medium can be retrieved and an optimum distribution process can be performed according to the meta data. Since functions are distributed as objects, the whole system becomes simple and quality is improved. Since distributed processes can be locally optimized, processes and responses become faster.

The user operates a device such as a mouse on the menu screen to create a setting file for the application computer 111 as shown in FIG. 10. The setting file defines the foregoing four modes. Namely, the setting file defines the only-informing mode (at step S21), the proxy file transferring mode (at step S22), the high res file (MXF file) transferring mode (at step S23), and the partial reproduction mode (at step S24) as #0, #1, #2, and #3. # represents a comment. In the example shown in FIG. 10, #3 (partial reproduction) has been set. In addition, the setting file describes an IP address and a path of the host system as a transfer destination.

This setting file defines an operation performed when a disc is inserted into a storage device and a transfer destination of data recorded on the disc.

It should be understood by those skilled in the art that various modifications, combinations, sub-combinations and alternations may occur depending on design requirements and other factors insofar as they are within the scope of the appended claims or the equivalents thereof. For example, the attribute of a disc may be determined based on meta data or the like instead of whether or not an inserted disc contains a management file. In addition, information of an edit list may be described in other than SMIL.

What is claimed is:

1. A medium management method, comprising the steps of:
    conveying a removable medium to a drive section when the removable medium is inserted into a medium accommodation section;
    causing the drive section to reproduce and read information from the medium and determines whether the medium is a first medium on which data externally created have been recorded or a second medium on which data internally created have been recorded according to the information that has been read by the drive section;
    performing a partial reproduction operation according to an edit list recorded on the first medium and transferring the reproduced data to a pre-designated host system when the determined result denotes that the inserted medium is the first medium;
    registering the second medium to a database when the determined result denotes that the inserted medium is the second medium; and
    returning the medium to the medium accommodation section after one of the partial reproduction operation and the database registration process has been completed.

2. The medium management method as set forth in claim 1, wherein the medium is determined as the first medium or the second medium depending on whether or not the medium contains a management file that is internally recorded.

3. The medium management method as set forth in claim 1, further comprising the steps of:
    determining whether or not the first medium contains the edit list when the determined result of the first determining step denotes that the inserted medium is the first medium; and
    informing the pre-designated host system that the first medium has been accommodated in the medium accommodation section when the determined result of the second determining step denotes that the disc does not contain the edit list.

4. The medium management method as set forth in claim 1, further comprising the steps of:
    causing high resolution video data and low resolution video data to be recorded to the medium;
    determining whether or not the medium contains the edit list when the determined result of the first determining step denotes that the inserted medium is the first medium; and
    causing the control section to transfer one of the high resolution video data and the low resolution video data recorded on the first medium to the pre-designated host system when the determined result of the third determining step denotes that the medium does not contain the edit list.

5. A storage device, comprising:
    a medium accommodation section which accommodates a removable medium and is capable of replacing the medium with another one;
    a drive section which records/reproduces data to and from the medium;
    a conveying section which conveys the medium between the medium accommodation section and the drive section;
    a control section which controls the drive section and the conveying section, creation of a database to manage the medium accommodated in the medium accommodation section, and communication with a host system;
    wherein the control section controls the conveying section to convey the medium inserted in the medium accommodation section to the drive section and determines whether or not the medium is a first medium on which data externally created have been recorded or a second medium on which data internally created have been recorded according to the information that has been read by the drive section,
    wherein the control section performs partial reproduction operation according to an edit list recorded on the first medium and transfers the reproduced data to a pre-designated host system when the determined result denotes that the inserted medium is the first medium,
    wherein the control section registers the second medium to the database when the determined result denotes that the inserted medium is the second medium, and
    wherein the control section controls the conveying section to return the medium to the medium accommodation section when one of the partial reproduction operation and the database registration process has been completed.

* * * * *